Sept. 15, 1959  E. STUMP  2,904,021
COOLING SYSTEM FOR AIR-COOLED INTERNAL COMBUSTION
ENGINES, AND PARTICULARLY AUTOMOBILE ENGINES
Filed Jan. 10, 1956  2 Sheets-Sheet 1
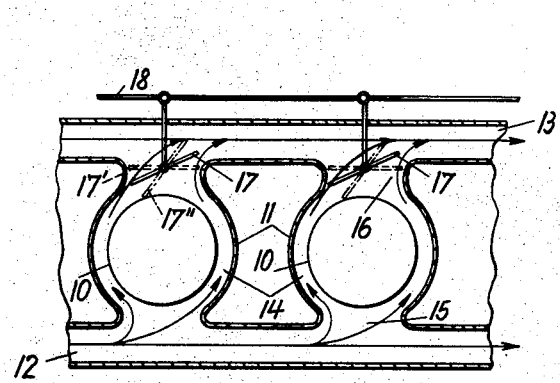
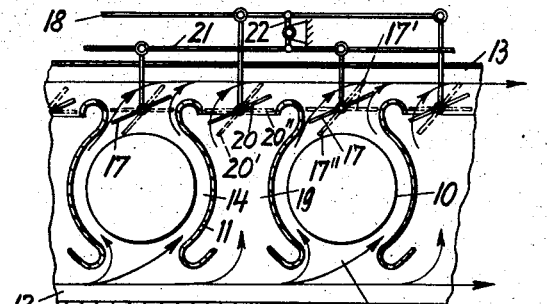
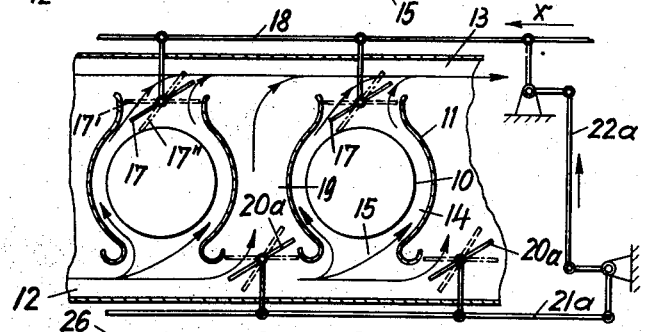
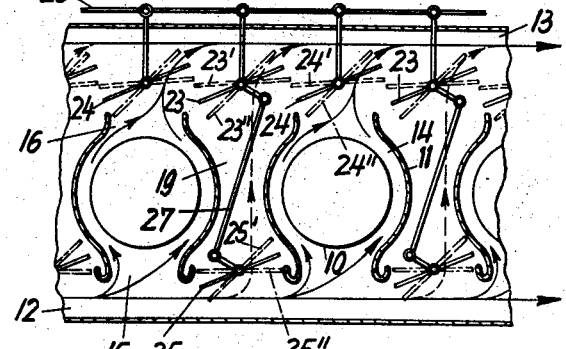
INVENTOR
EUGEN STUMP
BY Dicke and Craig
ATTORNEYS Sept. 15, 1959 E. STUMP 2,904,021
COOLING SYSTEM FOR AIR-COOLED INTERNAL COMBUSTION
ENGINES, AND PARTICULARLY AUTOMOBILE ENGINES
Filed Jan. 10, 1956 2 Sheets-Sheet 2
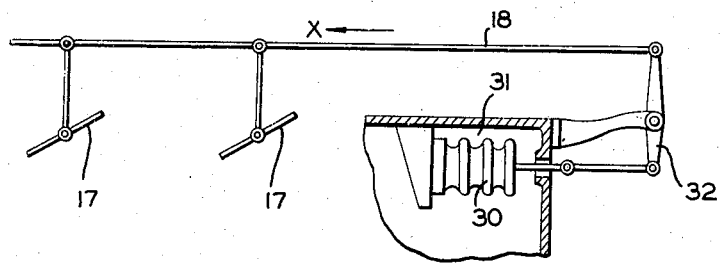
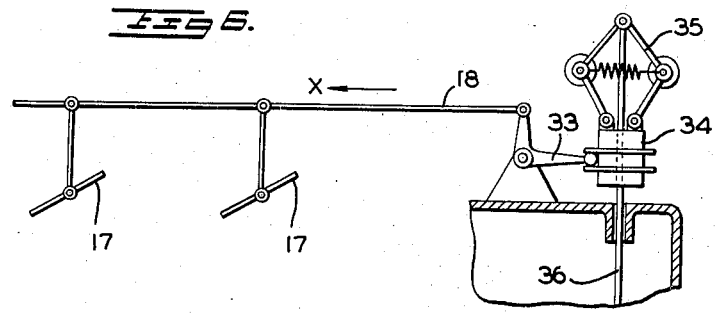
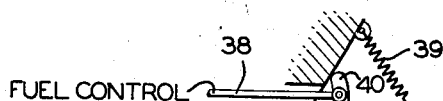
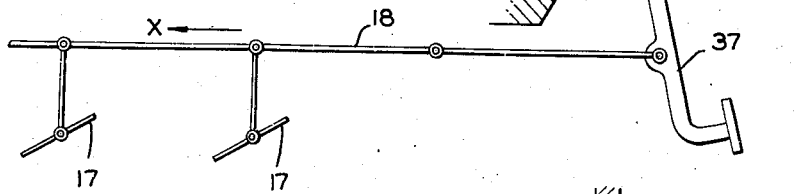
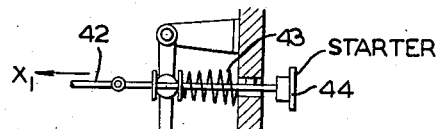
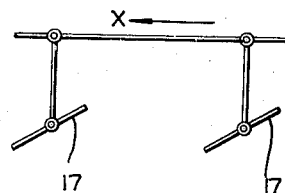
INVENTOR.
EUGEN STUMP
BY Dicke and Craig
ATTORNEYS United States Patent Office 2,904,021
Patented Sept. 15, 1959

2,904,021

COOLING SYSTEM FOR AIR-COOLED INTERNAL COMBUSTION ENGINES, AND PARTICULARLY AUTOMOBILE ENGINES

Eugen Stump, Stuttgart-Unterturkheim, Germany, assignor to Daimler-Benz Aktiengesellschaft, Stuttgart-Unterturkheim, Germany Application January 10, 1956, Serial No. 558,319

Claims priority, application Germany January 10, 1955

16 Claims. (Cl. 123—41.05)

The present invention relates to a cooling system for air-cooled internal combustion engines, and particularly automobile engines.

It is a primary object of the present invention to provide a cooling system for controlling and regulating the cooling intensity in accordance with the varying requirements occurring during the operation of an engine so that there will only be a minor cooling action when the engine operates under a small load, and a stronger cooling action when the engine operates under a heavier load.

More specifically it is an object of the invention to provide a control system which permits the individual currents of cooling air passing around or between the individual cylinders of an engine to be partly restricted or shut off entirely from such passage.

It is therefore another object of the present invention to provide the individual engine cylinders with suitable cooling jackets, and suitable means near or within such jackets for separately regulating the strength of the air currents passing through each individual cooling jacket or individual groups of such jackets, or for shutting off the individual air currents entirely.

A further object of the invention is to provide suitable control means for also regulating the cooling air which bypasses the cooling jackets and flows, for example, through a channel formed between the cooling jackets of adjacent engine cylinders.

Another object of the invention is to provide the most suitable type of adjustment and arrangement of the control elements for regulating the cooling air, and especially such a type of adjustment which permits the cooling air flowing through the cooling jackets to be restricted or shut off, while the cooling air passing between the cooling jackets may flow freely, or vice versa.

The control or valve elements according to the present invention may be operated individually, in groups or altogether, and such operation may be carried out at random, semi-automatically or fully automatically. An automatic adjustment of the control elements may, for example, occur as a function of the temperature of the engine, while a semi-automatic adjustment may occur as a function of the adjustment of other control elements, for example, the starter mechanism, the fuel control mechanism, or a speed governor of the engine. Preferably, the control elements are held in a closed position so as to shut off the cooling air from the cylinders until the engine has been warmed up and has reached a certain higher temperature.

Further objects, features, and advantages of the present invention will be apparent from the following detailed description thereof, as well as from the accompanying drawings, in which—

Fig. 1 shows a diagrammatic cross section through a part of the engine block with two cylinders, their cooling jackets, and control means for regulating the passage of cooling air therethrough;

Figs. 2 to 4 show similar views of three modifications of the invention;

Fig. 5 shows diagrammatically the automatic adjustment of the control elements for controlling the cooling air through the cooling jackets in response to the engine temperature and in accordance with the present invention;

Fig. 6 shows diagrammatically the automatic adjustment of the cooling air control elements in response to the speed of the engine;

Fig. 7 shows diagrammatically the manual adjustment of the cooling air control elements in response to the load on the engine; while Fig. 8 shows diagrammatically the manual adjustment of the cooling air control elements by means of the starter mechanism according to the present invention.

Referring to the drawings, each individual engine cylinder 10 is surrounded by a cooling jacket 11 to which the cooling air is supplied through a collecting channel 12 at one side of the engine and from which it is discharged through an other collecting channel 13 at the other side of the engine.

The inside of cooling jackets 11 communicates with intake channel 12 through an opening 15, and with outlet channel 13 through an opening 16. In order to reduce the resistance to the flow of the cooling air, the inlets to and outlets from the inside of cooling jackets 11 may be of nozzle-like shape.

The simplest embodiment of the invention is illustrated in Fig. 1, in which butterfly valves 17 or similar control members are provided in the outlet openings 16 of cooling jackets 11 at a point behind cylinders 10, as seen in the direction of flow of the cooling air. Valves 17 may be jointly adjusted by a control rod 18, either by hand or automatically in accordance with the temperature of the engine.

While the engine is stopped and until it is warmed up, butterfly valves 17 are preferably kept in the closed position 17' as shown in dotted lines in Fig. 1, while when the engine is running under a partial load, valves 17 may be kept in the full-line position, and when under a full load in the fully open position 17", as shown in dot-and-dash lines. Thus, while the engine is standing still and until it is warmed up sufficiently, the cooling air is prevented from flowing through the channels 14 of cooling jackets 11, while when the engine is running under full load, a strong air current may pass from inlet 12 through cooling channels 14 to outlet 13.

If desired, the cooling jackets may be omitted by providing one or more dampers or throttling elements at the entry or discharge side of the cooling air, and such elements may be designed and adjusted, for example, similar to louvers.

According to the modification of the invention as shown in Fig. 2, the cooling air can flow not only through channels 14 of cooling jackets 11, but also through the area 19 intermediate the adjacent cooling jackets. Butterfly valves 20 are provided to regulate or shut off the air passage through each individual channel 19, and may be connected, for example, to a control rod 21 which, in turn, is connected through a suitable reversing gear 22 to the main control rod 18 so that, when valves 17 are being opened, valves 20 will be closed, or vice versa. When the engine is at a stand-still and until it is properly warmed up and valves 17 are in their closed position 17', valves 20 may be fully opened in the position 20' so that the cooling air may pass from inlet 12 thorugh the intermediate channels 19 to the outlet 13, while the passage of cooling air through the cooling channels 14 in cooling jackets 11 will be closed. Vice versa, when the engine is running under a full load, valves 17 will be fully opened and in position 17", while valves 20 will then be fully closed and in position 20" so that all the cooling air will flow through the cooling jackets and produce a maximum cooling effect upon cylinders 10.

The embodiment of the invention as shown in Fig. 3, while operating similar to that shown in Fig. 2 differs therefrom by the fact that rather than being provided at the outlet side of the intermediate channels 19, the butterfly valves or similar control elements 20a are mounted at the entry side of chanels 19. Similarly as in Fig. 2, control rod 18 of valves 17 are connected with control rod 21a of valves 20a by means of reversing rods 22a so that, when valves 17 are being opened by a movement of control rod 18 in the direction of the arrow x, valves 20a will be closed, or vice versa. Obviously, if desired, valves 17 may also be mounted at the entry side 15 of cooling channels 14.

Another very preferred embodiment of the invention is illustrated in Fig. 4, in which butterfly or similar control valves 23 and 24 are provided behind cylinders 10, as seen in the direction of flow of the air current, and additional valves 25 at the entry side to the intermediate channels 19 between the cylinders. As is clearly shown, valves 23 and 24 are mounted like louvers in a series one next to the other and at a certain distance from the outlet openings 16 of cooling channels 14.

Valves 23 and 24 are connected with each other by a control rod 26, while valves 25 are connected to rod 26 by reversing rods 27.

When the engine is at a standstill and until it has warmed up sufficiently, valves 23 and 24 will be in their closed position 23' and 24', respectively, so that the cooling air will be prevented from flowing out of cooling channels 14 into outlet channel 13. Valves 25 at the inlet side of intermediate channels 19 may at such time be in their open position 25'. If the engine should then be running under a small load or in neutral, valves 23 and 24 will partly open, for example, to the position shown in full lines, while at the same time valves 25 will also move to such partly open position, as shown in full lines. The cooling air may thus flow through cooling channels 14, as well as through intermediate channels 19, and past valves 23 and 24 to outlet channel 13.

If the engine is to run under a full load, valves 23 and 24 will be fully opened and in positions 23" and 24", while valves 25 will be closed and in position 25". Thus, all the cooling air will then pass through cooling channels 14.

The embodiment of the invention as shown in Fig. 4 has the advantage over those shown in Figs. 2 and 3 that the louver-like arrangement of valves 23 and 24, when in the open position, will permit the cooling air to flow off practically without any resistance.

Obviously, if desired, the relative position of valves 23 and 24, on the one hand, and valves 25, on the other hand, may be reversed so that valves 23 and 24 will be disposed at the inlet side 15 of cooling channels 14. For simpler, less expensive cooling systems, valves 23 and 24 may be sufficient and valves 25 be omitted entirely. Instead of passing the cooling air through separate intake and outlet channels 12 and 13, it may also be branched off from and returned to the surrounding air, for example, the air stream produced in driving.

The automatic control mechanism for automatically regulating the quantity of cooling air passing through the engine as illustrated in Fig. 5 may consist of a thermostat 30 located in a chamber 31 within the engine. This chamber 31 may also be connected to the engine lubricating oil system. The thermostat 30 is operatively connected to the control rod 18 by means of a lever 12. If the temperature of the engine exceeds a certain value, the thermostat 30 will move the control rod 18 in the direction of the arrow x, whereby the valves 17 are opened and the cooling action of the cooling air increased.

In the embodiment according to Fig. 6, the control rod 18 is connected through a lever 33 to the adjusting collar of the engine speed governor 35, which may be mounted to the engine housing and driven, for instance, from the engine crankshaft through shaft 36. If a certain engine speed is exceeded, the action of the speed governor 35 moves the control rod in the direction of arrow x, whereby the cooling action on the individual cylinders is increased.

In the control system according to Fig. 7, the control rod 18 is operatively connected to the gas pedal 37 which, by means of the control rod 38, regulates the fuel throttle in the case of a gas engine or the injection pump in the case of a compression ignition engine. The gas pedal 37 is maintained in its initial position by a spring 39 and a stop member 40. When the gas pedal is depressed, the control rod 18 is moved in the direction of arrow x, whereby cooling of the cylinders is increased in response to an increase in the load of the engine.

In the control arrangement according to Fig. 8, the control rod 18 is operatively connected with the starter rod 42 by means of a lever 41. Spring 43 tends to push the starter rod 42 in the direction of arrow $x_1$, but during starting of the engine rod 42, is moved to the right in the direction opposite to that of x by means of a starter button 44. By this movement, the lever 41 moves the control rod 18 in the opposite direction of arrow x, whereby cooling of the engine cylinders is suppressed. After the engine is started, the starter button 44 is released, whereby the rod 42, on the one hand, is moved in the direction of arrow $x_1$, and the control rod 18, on the other hand, is moved in the direction of arrow x under the action of the spring 43.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A cooling system for air-cooled internal combustion engines comprising a plurality of engine cylinders mounted in a row next to each other, cooling jackets substantially enclosing said cylinders, but spaced therefrom so as to form cooling channels around said cylinders, each of said jackets having inlet and outlet openings at opposite sides of said cylinders having a width smaller than the diameter of said jacket, an inlet channel leading to said inlet openings and an outlet channel separate therefrom which leads away from said outlet openings, and means for adjusting the size of at least said outlet openings and for opening and closing the same to regulate the amount of cooling air passing through said cooling channels.

2. A cooling system for air-cooled internal combustion engines comprising a plurality of engine cylinders mounted in a row next to each other, cooling jackets substantially enclosing said cylinders but spaced therefrom so as to form cooling channels around said cylinders, each of said jackets having inlet and outlet openings at opposite sides of said cylinders, the jackets of adjacent cylinders being spaced from each other so as to form an intermediate air channel, said intermediate channel having inlet and outlet openings, and means for adjusting the size of at least said outlet openings and for opening and closing the same to regulate the air currents flowing through said cooling channels and said intermediate channel, respectively.

3. A cooling system for air-cooled internal combustion engines comprising a plurality of engine cylinders mounted in a row next to each other, cooling jackets substantially enclosing said cylinders but spaced therefrom so as to form cooling channels around said cylinders, each of said jackets having inlet and outlet openings at opposite sides of said cylinders, the jackets of adjacent cylinders being spaced from each other so as to form an intermediate air channel, said intermediate channel having inlet and outlet openings, and means for adjusting the size of some of said inlet openings and some of said outlet openings for opening and closing the same to regulate the amount of cooling air flowing, on the one hand, through said cooling channels, and, on the other hand, through said intermediate channel.

4. A cooling system as defined in claim 3, further comprising means for connecting said adjusting means so that when the air passage through said cooling channels is closed, the air passage through said intermediate channel will be opened.

5. A cooling system as defined in claim 1, wherein said adjusting means comprise a plurality of valve members disposed behind said engine cylinders, as seen in the direction of flow of the cooling air.

6. A cooling system as defined in claim 3, wherein said adjusting means comprise a plurality of valve members disposed at said outlet openings of said cooling channels, and valve means for controlling the passage of cooling air through said intermediate channel.

7. A cooling system as defined in claim 6, wherein said last valve means are disposed at said inlet opening of said intermediate channel.

8. A cooling system as defined in claim 6, wherein said last valve means are disposed both at said inlet and outlet openings of said intermediate channel.

9. A cooling system as defined in claim 2, wherein said adjusting means comprise valve members at least at the inlet opening of said intermediate channels and at least at the outlet opening of said cooling channels, and means for connecting said first and second valve members for adjusting them simultaneously.

10. A cooling system as defined in claim 2, wherein said adjusting means comprise valve members and means for adjusting said members simultaneously.

11. A cooling system as defined in claim 3, wherein said adjusting means comprise flaplike valve members disposed one beside the other like louvers and at one side of said row of cylinders, and means for adjusting said valve members at least in groups.

12. A cooling system as defined in claim 1, further comprising means for automatically adjusting said adjusting means in accordance with the temperature of said engine.

13. A cooling system as defined in claim 1, further comprising means for automatically adjusting said adjusting means in accordance with the load acting upon said engine.

14. A cooling system as defined in claim 13, wherein said engine includes a member for controlling the output thereof, said last means being connected with said control member so as to regulate said adjusting means to permit a substantially unrestricted passage of cooling air through said cooling channels when said engine is running under a full load, and to substantially close said cooling channels when said engine is substantially idling.

15. A cooling system as defined in claim 1, further comprising means for automatically controlling said adjusting means in accordance with the starting condition of said engine.

16. A cooling system as defined in claim 2, further comprising a manifold disposed along one side of said row of cylinders for supplying the cooling air, and a second manifold disposed along the other side of said row of cylinders for discharging the cooling air.

References Cited in the file of this patent

UNITED STATES PATENTS

| | | |
|---|---|---|
| 1,386,381 | Taggard | Aug. 2, 1921 |
| 1,803,952 | Upton et al. | May 5, 1931 |
| 1,910,834 | Hoy | May 23, 1933 |

FOREIGN PATENTS

| | | |
|---|---|---|
| 874,734 | France | May 18, 1942 |